United States Patent
Kobayashi et al.

(10) Patent No.: US 7,236,665 B2
(45) Date of Patent: Jun. 26, 2007

(54) OPTICAL MODULE AND METHOD FOR FABRICATING THE SAME

(75) Inventors: Fumitoshi Kobayashi, Osaka (JP); Kenichi Nakama, Osaka (JP); Katsuhide Shinmou, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 106 days.

(21) Appl. No.: 10/478,901

(22) PCT Filed: May 21, 2002

(86) PCT No.: PCT/JP02/04878

§ 371 (c)(1),
(2), (4) Date: Nov. 24, 2003

(87) PCT Pub. No.: WO02/095465

PCT Pub. Date: Nov. 28, 2002

(65) Prior Publication Data

US 2004/0165822 A1    Aug. 26, 2004

(30) Foreign Application Priority Data

May 23, 2001    (JP)    ............................. 2001-153541

(51) Int. Cl.
*G02B 6/32* (2006.01)
*G02B 6/26* (2006.01)

(52) U.S. Cl. ........................... 385/33; 385/31; 385/51; 385/52; 385/119

(58) Field of Classification Search .................. 385/35, 385/52, 31, 33, 51, 76–78, 119, 139
See application file for complete search history.

(56) References Cited

U.S. PATENT DOCUMENTS

| | | | |
|---|---|---|---|
| 5,185,846 A |   | 2/1993 | Basavanhally et al. |
| 5,346,583 A | * | 9/1994 | Basavanhally ................ 216/26 |
| 5,376,506 A | * | 12/1994 | Ehrfeld et al. ............... 430/321 |
| 6,190,834 B1 | * | 2/2001 | Narahara et al. ........ 430/284.1 |
| 6,361,718 B1 |   | 3/2002 | Shimmo et al. |
| 6,527,455 B2 | * | 3/2003 | Jian ............................. 385/88 |
| 6,530,554 B2 |   | 3/2003 | Shimmo et al. |
| 6,766,076 B2 | * | 7/2004 | Nakama et al. ................ 385/33 |
| 6,931,177 B2 | * | 8/2005 | Suzuki et al. .................. 385/33 |
| 7,167,618 B2 | * | 1/2007 | Kobayashi et al. ......... 385/115 |
| 2001/0051028 A1 | * | 12/2001 | Gutierrez et al. ............. 385/85 |
| 2002/0015920 A1 | * | 2/2002 | Steinberg .................... 430/321 |

FOREIGN PATENT DOCUMENTS

| | | |
|---|---|---|
| DE | 42 38 188 A1 | 5/1994 |
| JP | 55-48708 A | 4/1980 |
| JP | 63-226607 | 9/1988 |
| JP | 2-123301 A | 5/1990 |
| JP | 5-333232 A | 12/1993 |
| JP | 2000-266965 A | 9/2000 |
| JP | 2001-9843 A | 1/2001 |
| WO | WO 97/35811 | 10/1997 |
| WO | WO 99/39890 | 8/1999 |

OTHER PUBLICATIONS

International Search Report, Aug. 20, 2002.

* cited by examiner

*Primary Examiner*—Michelle Connelly-Cushwa
*Assistant Examiner*—Rhonda S. Peace
(74) *Attorney, Agent, or Firm*—RatnerPrestia

(57) ABSTRACT

An optical module is provided in which recesses are formed in a sol-gel layer applied to a surface of a lens array substrate, each of the recesses having a capability to fit an optical fiber therein. The optical module comprises a planar microlens array substrate having a plurality of microlenses formed in one surface thereof; and an alignment recess array including a plurality of alignment recesses which are formed in a material applied to the other surface of the microlens array substrate by means of a mold with the center of each alignment recess being aligned to the center of a corresponding one of the microlens. The optical module may comprise a plurality of optical fibers each end thereof is adhered to the alignment recesses.

21 Claims, 8 Drawing Sheets

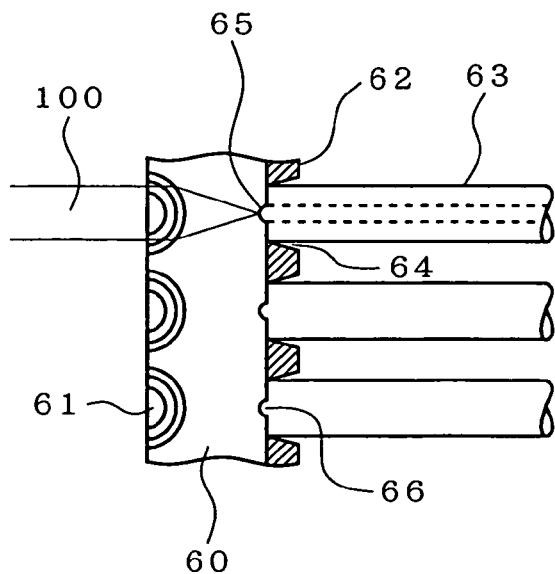
F I G. 1
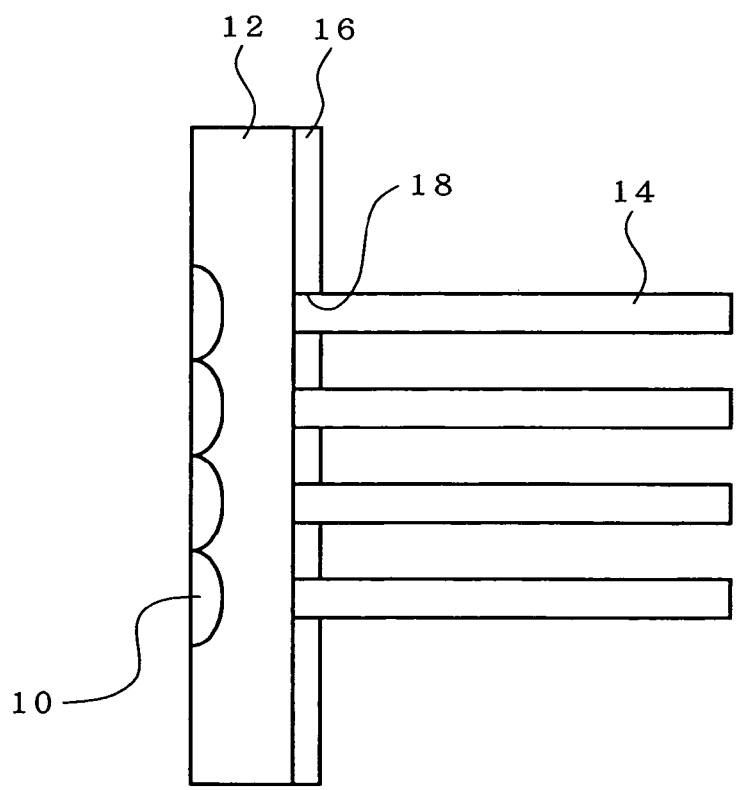
F I G. 2

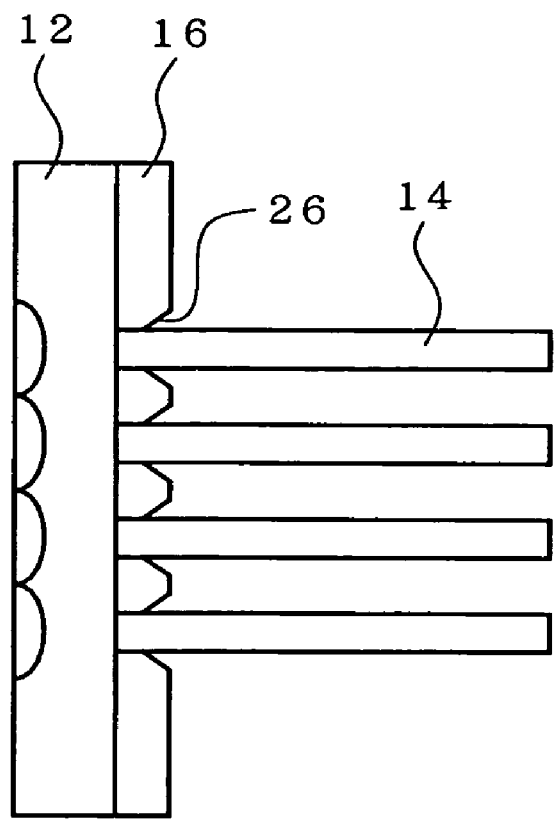
F I G. 5 A
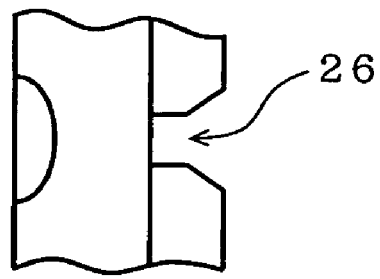
F I G. 5 B

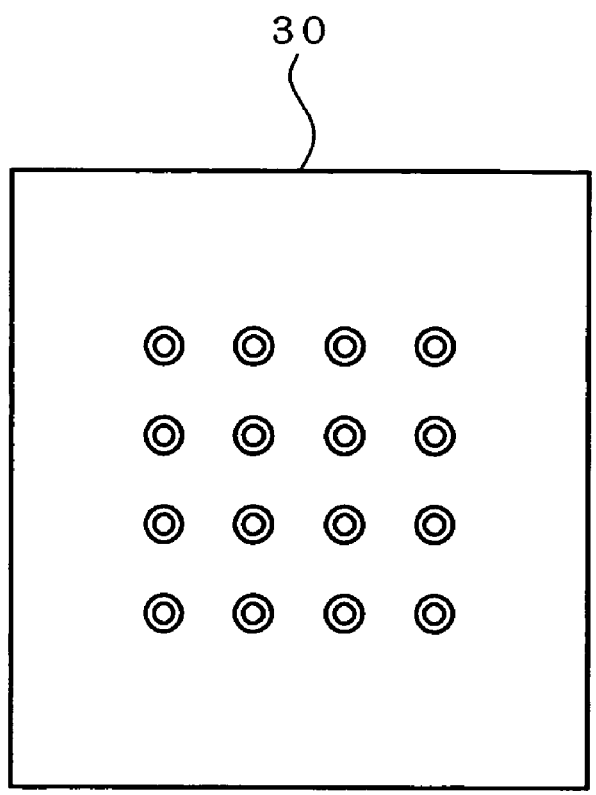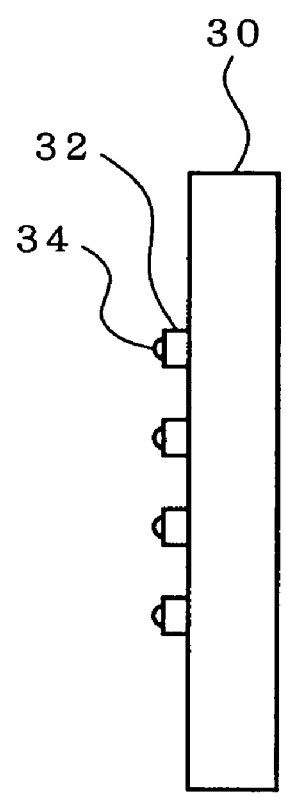
F I G. 6 A
F I G. 6 B

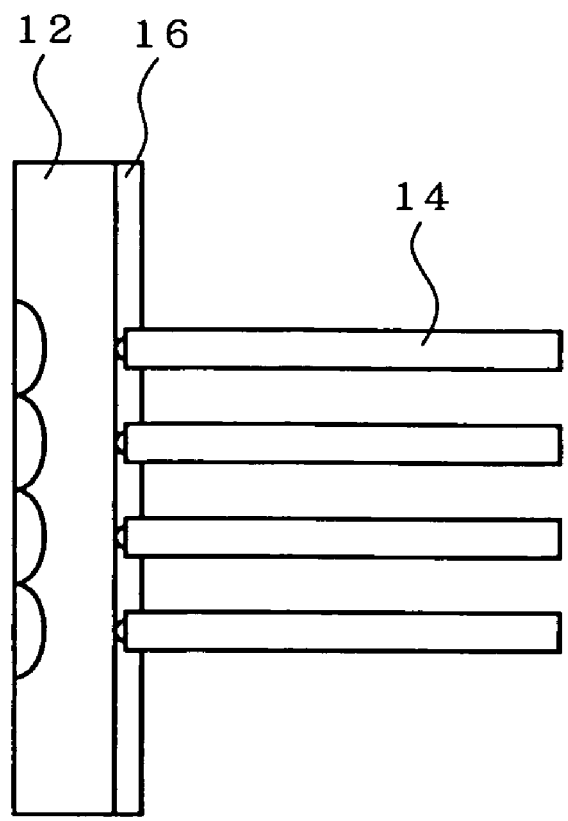
F I G. 7 A
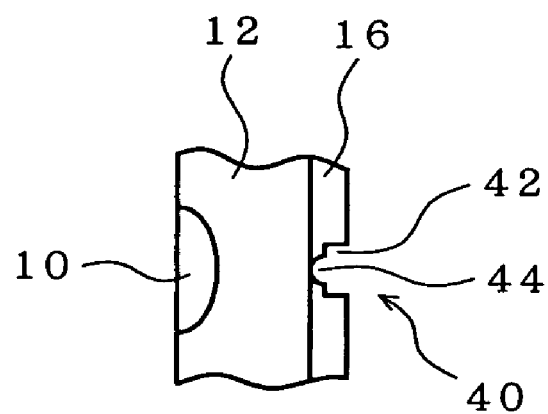
F I G. 7 B

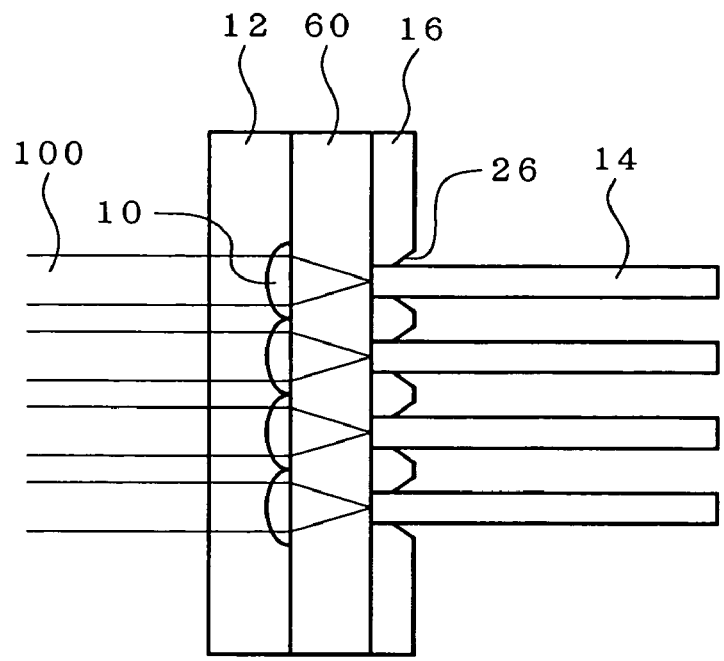
F I G. 9 A
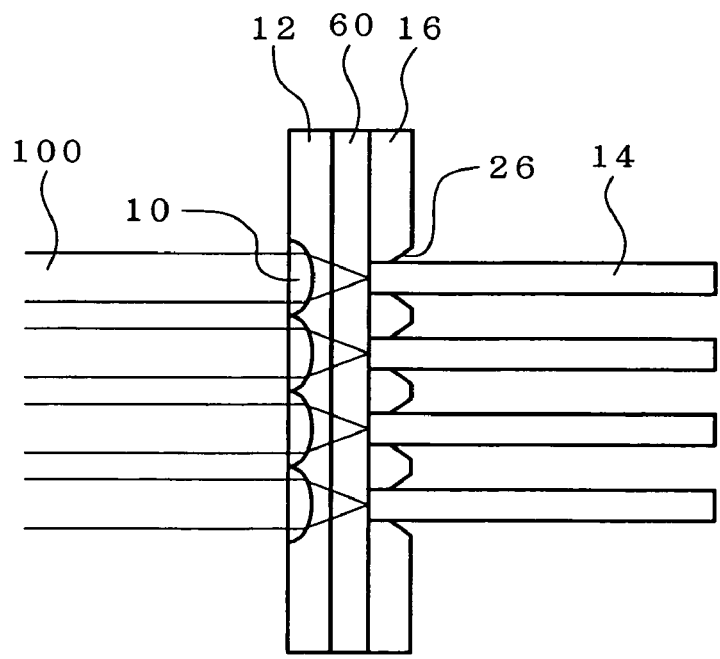
F I G. 9 B

OPTICAL MODULE AND METHOD FOR FABRICATING THE SAME

TECHNICAL FIELD

The present invention generally relates to an optical module, particularly to an optical module which is densely space-division multiplexed by using a microlens array, and a method for fabricating the optical module.

BACKGROUND ART

A conventional optical module of this type has been disclosed in Japanese patent No. 2719804, for example. This conventional optical module comprises, as shown in FIG. 1, a planar microlens array 60 consisting of a planar transparent substrate having circular microlenses 61 formed in a surface thereof. Fitting recesses 65 are formed in a surface opposite to the lens-formed surface of the array 60, each of recesses 65 being aligned with the center of a corresponding microlens 61. An optical element to be optically coupled to the microlens 61 is an optical fiber 63, for example. The end core portion of an optical fiber is processed by a selective etching to form a micro fitting convex portion 66. According to the conventional optical module described above, an alignment can easily be conducted by inserting the convex portion 66 of an optical fiber into the fitting recess 65 to fix it thereto, instead of an active alignment (i.e., light is guided into an optical fiber and the position of the optical fiber is regulated so as to maximize light coupled to a microlens). In FIG. 1, the light from the end of the optical fiber 63 is transferred into collimated light 100 by means of the microlens 61.

According to the conventional optical module, there is a problem such that a fabrication of an optical module is complicated because fitting recesses are required for a planar microlens array thereby fixing optical fibers, and a fitting convex portion is required at the end of an optical fiber.

Furthermore, a step for fabricating a resin layer having guide holes through which an end of an optical fiber is inserted is required. In the technique disclosed in described-above Japanese Patent No. 2719804, while guide holes are formed in a resin layer by a lithography process, the process is very complicated.

There is another method for fixing a guide substrate for optical fibers to a planar microlens array in which guide holes have been opened. In this case, a machining such as a laser beam machining, a drilling, or an ultrasonic machining is used as a method for opening holes.

While a laser beam machining is a relatively low cost method, it has problems such that the control of a diameter of a hole is difficult resulting in a low circular degree of a hole, and furthermore the taper of a guide hole is not preferably controlled. In addition, the kind of a material for a substrate to be processed is limited. Also, a backing to a substrate is required to prevent a chipping (i.e., a partial peeling of a substrate) from being caused on a bottom side of a substrate. However, a chipping may not be completely prevented for a backed substrate. An adhering, separating and cleaning steps are further required for backing a substrate.

It is also difficult for a machining to precisely open a hole the diameter thereof is on the order of 125 μm.

In an aligning method using a guide substrate for optical fibers, an aligning process between a planar microlens array and a guide substrate for optical fibers is required during the assembling of an optical module. In order to prevent misalignment between an optical fiber and a microlens due to a temperature change, the coefficient of thermal expansion of a microlens array substrate and that of a guide substrate for optical fibers must be the same.

DISCLOSURE OF INVENTION

Accordingly, an object of the present invention is to provide an optical module wherein recesses are formed in a sol-gel layer applied to a surface of a lens array substrate, each of the recesses having a capability to fit an optical fiber therein.

Another object of the present invention is to provide an optical module in which an inlet portion of a recess formed in the sol-gel layer has a capability to guide an optical fiber therein.

A further object of the present invention is to provide an optical module in which an optical element is formed at a bottom portion of the recess formed in the sol-gel layer.

A still further object of the present invention is to provide a method for fabricating the optical module described above.

A first aspect of the present invention is an optical module comprising a planar microlens array substrate having a plurality of microlenses formed in one surface thereof; and an alignment recess array including a plurality of alignment recesses which are formed in a material applied to the other surface of the microlens array substrate by means of a mold with the center of each alignment recess being aligned to the center of a corresponding one of the microlens.

A second aspect of the present invention is an optical module comprising a planar microlens array substrate having a plurality of microlenses formed in at least one surface thereof; a planar transparent substrate for adjusting a conjugate ratio, one surface thereof being adhered to a surface of the lens array substrate; and an alignment recess array including a plurality of alignment recesses which are formed in a material applied to the other surface of the transparent substrate by means of a mold with the center of each alignment recess being aligned to the center of a corresponding one of the microlens.

In these optical modules, an inlet portion of each alignment recess has a tapered portion for guiding an optical fiber to be inserted into the alignment recess.

Also, in these optical modules, an optical element formed at the bottom of an alignment recess.

Furthermore, these optical modules comprise a plurality of optical fibers each end thereof is adhered to the alignment recesses.

A third aspect of the present invention is a method for fabricating an optical module comprising the steps of preparing a mold having convex portions to form a plurality of alignment recesses for optical fibers; providing a sol-gel layer by applying a sol-gel material on one surface of a planar microlens array substrate having a plurality of microlenses formed in the other surface thereof; forming the alignment recesses by pressing the mold to the sol-gel layer to transfer the convex portions to the sol-gel layer; and baking and curing the sol-gel layer in which the alignment recesses are formed.

A fourth aspect of the present invention is a method for fabricating an optical module comprising the steps of preparing a mold having convex portions to form a plurality of alignment recesses for optical fibers; providing a sol-gel layer by applying a sol-gel material on one surface of a planar transparent substrate for adjusting a conjugate ratio, forming the alignment recesses by pressing the mold to the sol-gel layer to transfer the convex portions to the sol-gel layer; baking and curing the sol-gel layer in which the alignment recesses are formed; and adhering the other surface of the transparent substrate to one surface of a planar microlens array substrate having a plurality of microlenses formed in the other surface thereof with the center of each alignment recesses being aligned the center of a corresponding one of the microlens.

In these methods, the step of forming the alignment recesses includes forming a tapered portion at an inlet portion of each alignment recess for guiding an optical fiber to be inserted into the alignment recess.

Also, in these methods, the step of forming the alignment recesses includes forming a recess for an optical element at the bottom of the alignment recess.

These methods further comprise the steps of fitting the end of an optical fiber to the alignment recess; and adhering the end of an optical fiber to the alignment recess by adhesive.

BRIEF DESCRIPTION OF DRAWINGS

FIG. 1 shows a structure of a conventional optical module.

FIG. 2 shows a structure of an optical module of a first embodiment according to the present invention.

FIGS. 5A and 5B show an optical module having an alignment recess the inlet portion thereof is tapered.

FIGS. 6A and 6B show a mold used in a second embodiment.

FIGS. 7A and 7B show a structure of an optical module of a second embodiment according to the present invention.

FIGS. 9A and 9B show a structure of an optical module of a third embodiment according to the present invention.

BEST MODE FOR CARRYING OUT THE INVENTION

First Embodiment

Figure 3A:
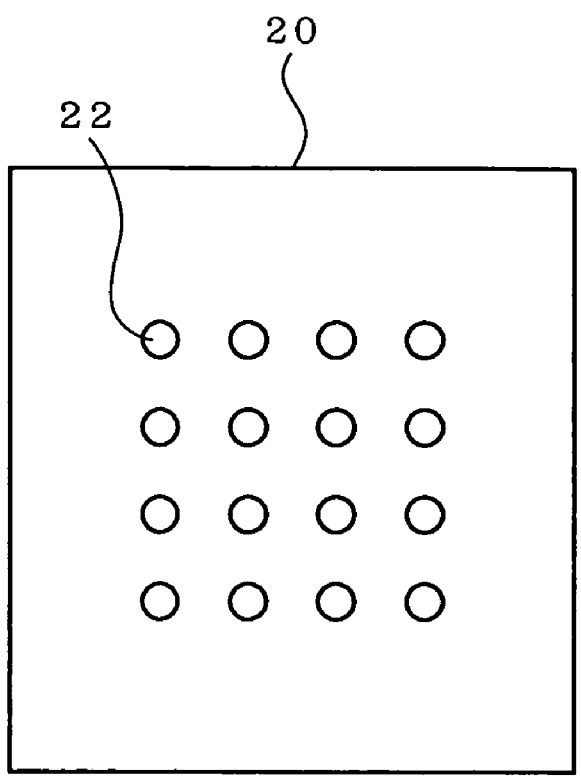
FIGS. 3A and 3B show a plan view and side view of a mold.

Referring now to FIG. 2, there is shown a first embodiment of an optical module according to the present invention. In order to mount sixteen optical fibers 14 the diameter of each optical fiber being 125 µm on a lens array substrate 12 of 3 mm thick in which 4×4 microlens are formed in a lens pitch of 250 µm, an alignment recess array consisting of a sol-gel layer 16 is fabricated on a surface (i.e., a surface to which optical fibers are connected) of the lens array substrate 12. In the figure, reference numeral 18 denotes an alignment recess.

Figure 3B:
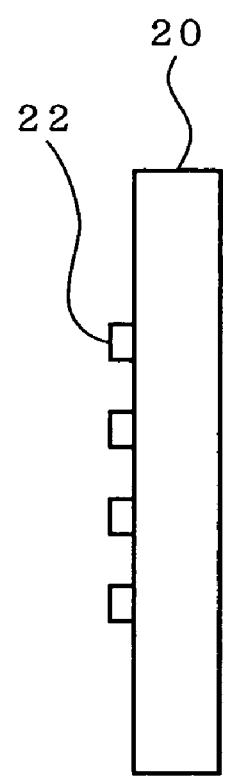

The recess array is fabricated by applying a sol-gel material to a surface of the lens array and by pressing a mold to the sol-gel material form recesses. FIGS. 3A and 3B show a plan view and side view of a mold 20 to be used. The mold is fabricated by a machining, which comprises 4×4 cylindrical convex portion 22 arranged in a 250 µm pitch, each thereof having a diameter of 127 µm and a height of 30 µm.

Figure 4A:
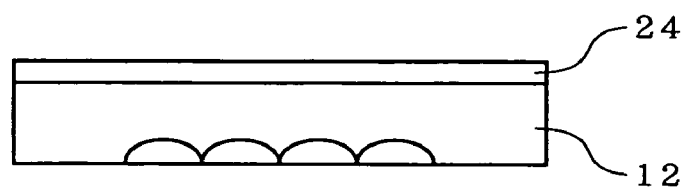
FIGS. 4A, 4B and 4C show the steps for fabricating an alignment recess array.
Figure 4B:
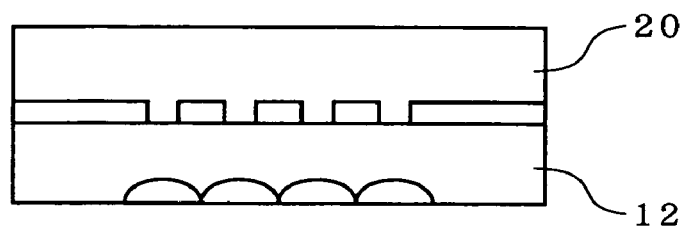
Figure 4C:
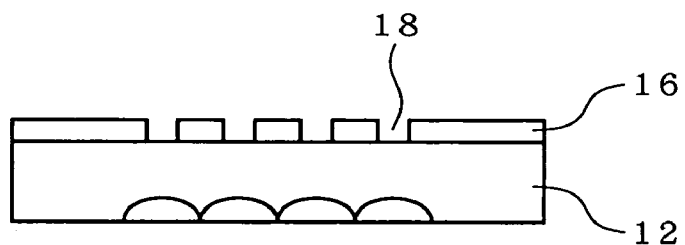

Referring to FIGS. 4A, 4B and 4C, there are shown the steps for fabricating an alignment recess array by using the mold described above. As shown in FIG. 4A, a sol-gel material 24 is applied to a surface of the lens array 12 to which optical fiber are connected to form a sol-gel layer of approximately 35 µm thick.

Next, as shown in FIG. 4B, the mold 20 is pressed to the sol-gel layer with the position of the lenses and that of the convex portions of the mold being aligned thereby transferring the shape of the convex portion to the sol-gel layer. After forming cylindrical alignment recesses 18 by such a press molding, the mold 20 is released as shown in FIG. 4C. The lens array substrate 12 provided with a formed sol-gel layer is baked to cure the sol-gel layer.

The thickness of the baked sol-gel layer 16 may be in a range of 30±3 µm, the diameter of the cylindrical recess may be in a range of 127±2 µm, and the pitch of recesses may be in a range of 250±2 µm. As a result, a misalignment of an optical fiber with respect to an optical axis of the microlens may be in a range of ±2 µm.

Next, a UV-curing adhesive is applied in the recesses 18 formed in the sol-gel layer 16, the ends of the optical fibers are fitted to the recesses, and UV ray is irradiated to adhere the ends of the optical fibers to the recesses.

In the optical module thus fabricated, a thin sol-gel layer is left on the bottom of the recess 18 formed by a press molding. The thickness of the thin sol-gel layer is less than 1 µm which is the level not effecting an optical property.

The thickness of the baked sol-gel layer (30±3 µm) is fully thin in comparison with the thickness of 3 mm of the lens array substrate 12, so that it is understood that a stress due to a temperature change is not caused therein.

In the present embodiment, while a sol-gel material is used, a resin such as epoxy resin, photo (ultraviolet)-curing resin and the like may be used.

In the case that a photo-curing resin is used, the photo-curing resin is applied to the surface of the lens array substrate to which optical fibers are connected, and then a mold is pressed against the resin. Ultraviolet ray is irradiated to cure the resin. The mold is released and then a baking is implemented.

In the present embodiment, while the shape of the alignment recess 18 is a cylinder the diameter thereof is 127 µm, a prism such as a triangle pole, a square pole and the like to which a circle of 127 µm diameter is inscribed. In order to form such prismatic recesses, a mold having prismatic convex portions is required. The prismatic convex portions are easily made rather than the cylindrical convex portions in view of machining for a mold.

Also, the shape of an alignment recess is not limited to a column such as a cylinder or prism as described above, but the inlet portion of an alignment recess may be tapered.

An example of an optical module having such alignment recesses 26 described above is shown in FIGS. 5A and 5B. FIG. 5A shows a total view of an optical module, and FIG. 5B an enlarged view of an alignment recess 26. The recess 26 consists of an inlet portion consisting of circular cone (taper angle is 30°) the depth thereof is 20 µm and a bottom portion consisting of a cylinder the depth thereof is 20 µm.

The residual structure and a method of fabrication are the same as in the example described, consequently a further explanation will not be needed.

In the examples described above, while a mold is fabricated by a machining, it may be fabricated by etching a silicon substrate using a lithography process.

If a mechanical support for an optical fiber is not enough only by an alignment recess formed in the sol-gel layer as shown in FIG. 2 and FIGS. 5A and 5B, a guide substrate for optical fibers may be separately provided, in which tapered guide holes are opened.

Second Embodiment

In a second embodiment, an example will be explained, in which a lens-shape portion is formed on the top of a column portion of a mold. The lens-shape portion is transferred to a sol-gel layer together with an alignment recess. FIGS. 6A and 6B show a plan view and side view of a mold 30 used in the present embodiment. As shown in these figures, a mold 30 is formed having a semi-spherical portion 34 (the radius of curvature R of the part is 30 µm) on the top of the cylindrical convex portion 32 (the diameter thereof is 127 µm). Using the mold 30, alignment recesses are formed in the sol-gel layer 16 applied on the surface of the lens array substrate 12, in the same manner as in the embodiment 1.

FIG. 7A shows a total view of an optical module of the present embodiment, and FIG. 7B an enlarged view of a recess 40 transferred in the sol-gel layer 16. The cylindrical convex portion 32 of the mold 30 is transferred to form an alignment recess 42 in the inlet portion of the recess 40, and the semi-spherical portion 34 on the top of the cylindrical convex portion is transferred to form a recess 44 for a lens at the bottom of the alignment recess 42. An optical fiber 14 is adhered to the recess 40 in the sol-gel layer 16 by using UV-curing adhesive which has an index of refraction larger than that of the sol-gel material, with the recess 44 for a lens being filled with the adhesive.

Figure 8:
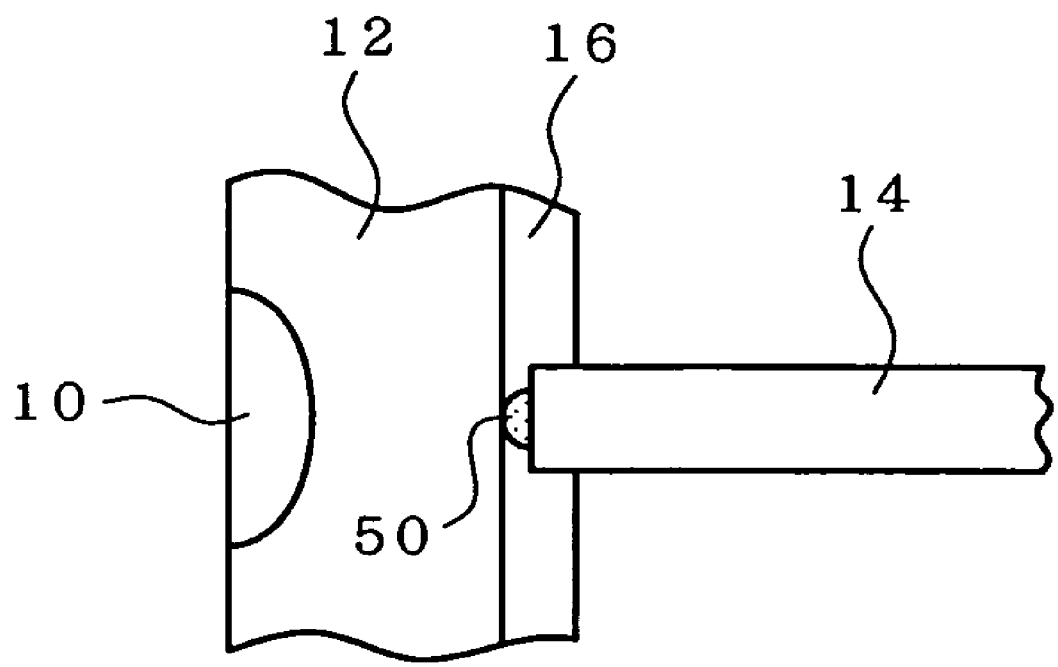
FIG. 8 shows the formation of a lens in a recess.

Referring to FIG. 8, there is shown an enlarged view of the recess to which an optical fiber is adhered. The adhesive 50 is filled in the recess 44 for a lens. As an index of refraction of the lens array substrate 12 is 1.54, that of the sol-gel layer 16 is 1.3, and that of the UV-curing adhesive 50 is approximately 1.6, the recess 44 may serve as a spherical lens.

As a result, the optical module of the present embodiment functions a two-lens optical system, so that the numerical aperture (NA) the optical module is smaller in comparison with that of the optical module in the first embodiment thereby decreasing the aberration thereof.

While a spherical lens is formed at the bottom of the recess 40 in the second embodiment, an aspherical lens may be formed.

An optical prism, beam splitter, or diffraction grating may also be formed at the bottom of the recess.

Third Embodiment

The optical module according to the first or second embodiments has a structure such that the optical fibers are directly connected to the lens array substrate. Where the optical module of such structure is used in combination with another planar optical element, e.g., a planar transmission optical element module such as a liquid crystal optical switch, a microlens optical system of the optical module must be constructed by a collimate optical system having an infinite conjugate ratio. On the contrary, where the optical module is coupled to a light-emitting element such as a layer array, a microlens system of the optical module must be constructed by a reduction image optical system having a finite conjugate ratio. It should be noted that the conjugate ratio means the ratio of an object distance to an image distance.

In the case of an optical module coupled to optical fibers, a microlens optical system is required to be constructed by a unity magnification image optical system, while in the case of an optical module coupled to a planar optical element such as a photo-detector array having a light-receiving area larger than a mode field diameter of an optical fiber, a microlens optical system is required to be constructed by a magnification image optical system.

In order to satisfy these requirements, planar microlens arrays each having a different focal length of microlens are prepared separately so that an optimal conjugate ratio may be obtained for respective application in the conventional optical module, or the thickness of a planar microlens array substrate is regulated to obtain an optimal conjugate ratio. As a result, the number of kinds of planar microlens arrays will be increased. Also, when the optical characteristic of an optical module is regulated in an experimental environment for example, it is often required to remake a planar microlens array. In such a case, an efficient development and early implementation of optical modules will be disturbed. In order to resolve such problems, a transparent substrate for adjusting a conjugate ratio may be provided between a planar lens array substrate and optical fibers.

Referring to FIGS. 9A and 9B, there is shown an embodiment of an optical module using a transparent substrate for adjusting a conjugate ratio. The optical module comprises a transparent substrate 60 for adjusting a conjugate ratio provided between a lens array substrate 12 and a sol-gel layer 16. An infinite conjugate ratio may be obtained by the transparent substrate 60. In FIGS. 9A and 9B the light from the end of the optical fiber 14 is transferred into the collimated light 100 by means of the microlenses 10.

The difference between the optical modules in FIGS. 9A and 9B is that the positions where the microlenses 10 are formed in the lens array 12 are different. That is, the microlenses 10 are formed in one surface to which the transparent substrate 60 is faced in FIG. 9A, and the microlenses 10 are formed in the other surface in FIG. 9B.

In order to fabricate such an optical module, a sol-gel material is applied to one surface of the transparent substrate 60 to form a sol-gel layer 16, a mold is pressed to the sol-gel layer to form alignment recesses 26, and the formed sol-gel layer is baked and cured.

Next, the other surface of the transparent substrate 60 is adhered to the surface of the lens array 12 with the center of the alignment recess 26 is matched to the center of the microlens 10.

Lastly, the optical fibers are inserted into the alignment recesses 26 and adhered thereto by adhesive.

The reason why at first the sol-gel layer is applied to the transparent substrate 60 to form the alignment recesses 26, and subsequently the transparent substrate 60 is adhered to the lens substrate 12 is as follows. The baking and curing of the sol-gel layer is implemented at a high temperature of 300-500° C. Therefore, if at first the transparent substrate is adhered to the lens substrate 12 by adhesive, and subsequently the sol-gel layer is applied, the adhesive can not bear with such a high temperature.

To provide a transparent substrate for adjusting a conjugate ratio in the present embodiment has an effect in increasing the degree of freedom for construction of a lens array substrate. Therefore, a lens array substrate may be replaced by a planar microlens array on both surfaces thereof microlenses are formed. A plurality of planar microlens arrays stacked and adhered to each other may also be used as a lens array substrate.

In this embodiment, an optical element may be formed at the bottom of an alignment recess in a sol-gel layer as illustrated in the second embodiment.

In this embodiment, a photo-curing resin may also be used in place of a sol-gel material. A baking is not required for a photo-curing resin, so that at first a lens array substrate 12 and a transparent substrate 60 may be adhered, and subsequently a photo-curing resin may be applied to the transparent substrate 60 to form alignment recesses. Alternately, at first a photo-curing resin may be applied to the transparent substrate 60 to form alignment recesses, and subsequently a lens array substrate 12 may be adhered to the transparent substrate 60 with aligning the centers of a microlens and an alignment recess.

INDUSTRIAL APPLICABILITY

According to the present invention, a recess array for aligning optical fibers to a lens array substrate may be fabricated by a forming process at a high precision and low cost.

A tapered portion for guiding an optical fiber may also be fabricated by designing the shape of a mold.

Furthermore, optical element such as lenses, beam splitters, diffraction gratings or the like may be formed together with an alignment recess array, the optical elements serving as spectroscopic elements, collective elements or the like. If lenses are formed at the bottoms of alignment recesses, a two-lens optical system is structured together with a microlens of a lens array substrate, so that there are effects such as decreased numerical aperture (NA) or decreased aberration.

The invention claimed is:

1. An optical module comprising:
a planar microlens array substrate having a plurality of microlenses formed in one surface thereof; and
an alignment recess array including a plurality of alignment recesses which are formed in a material applied to the other surface of the microlens array substrate by means of a mold with the center of each alignment recess being aligned to the center of a corresponding one of the microlens, wherein the material in which the alignment recesses are formed is one of a sol-gel material or a photo-curing resin and the plurality of alignment recesses include a layer of the material on a bottom surface of the alignment recesses, the layer of the material having a thickness less than 1 µm.

2. An optical module comprising:
a planar microlers array substrate having a plurality of microlenses formed in at least one surface thereof;
a planar transparent substrate for adjusting a conjugate ratio, one surface thereof being adhered to a surface of the lens array substrate; and
an alignment recess array including a plurality of alignment recesses which are formed in a material applied to the other surface of the transparent substrate by means of a mold with the center of each alignment recess being aligned to the center of a corresponding one of the microlens, wherein the material in which the alignment recesses are formed is one of a sol-gel material or a photo-curing resin.

3. The optical module of claim 1 or 2 wherein the shape of each of the alignment recesses is a cylinder or prism to which an optical fiber is inscribed.

4. The optical module of claim 1 or 2 wherein an inlet portion of each alignment recess has a tapered portion for guiding an optical fiber to be inserted into the alignment recess.

5. The optical module of claim 1 or 2 further comprising an optical element formed at the bottom of an alignment recess.

6. The optical module of claim 5 wherein the optical element is a lens composed of adhesive filled into a recess formed at the bottom of the alignment recess.

7. The optical module of claim 6 further comprising a plurality of optical fibers each end thereof is adhered to the alignment recesses.

8. The optical module of claim 1 or 2 further comprising a plurality of optical fibers each end thereof is adhered to the alignment recesses.

9. A method for fabricating an optical module comprising the steps of:
preparing a mold having convex portions to form a plurality of alignment recesses for optical fibers;
providing a sol-gel layer by applying a sol-gel material on one surface of a planar microlens array substrate having a plurality of microlenses formed in the other surface thereof;
forming the alignment recesses by pressing the mold to the sol-gel layer to transfer the convex portions to the sol-gel layer; and
baking and curing the sol-gel layer in which the alignment recesses are formed.

10. A method for fabricating an optical module comprising the steps of:
preparing a mold having convex portions to form a plurality of alignment recesses for optical fibers; providing a sol-gel layer by applying a sol-gel material on one surface of a planar transparent substrate for adjusting a conjugate ratio,
forming the alignment recesses by pressing the mold to the sol-gel layer to transfer the convex portions to the sol-gel layer;
baking and curing the sol-gel layer in which the alignment recesses are formed; and
adhering the other surface of the transparent substrate to one surface of a planar microlens array substrate having a plurality of microlenses formed in the other surface thereof with the center of each alignment recesses being aligned with the center of a corresponding one of the microlens.

11. The method of claim 9 or 10 wherein the step of forming the alignment recesses includes forming a tapered portion at an inlet portion of each alignment recess for guiding an optical fiber to be inserted into the alignment recess.

12. The method of claim 9 or 10 wherein the step of forming the alignment recesses includes forming a recess for an optical element at the bottom of the alignment recess.

13. The method of claim 12 further comprising the steps of:
fitting the end of an optical fiber to the alignment recess; and
adhering the end of an optical fiber to the alignment recess by adhesive while forming a lens by filling the recess for an optical element with the adhesive.

14. The method of claim 9 or 10 further comprising the steps of:
fitting the end of an optical fiber to the alignment recess; and
adhering the end of an optical fiber to the alignment recess by adhesive.

15. A method for fabricating an optical module comprising the steps of:
preparing a mold having convex portions to form a plurality of alignment recesses for optical fibers;
applying a photo-curing adhesive on one surface of a planar microlens array substrate having a plurality of microlenses formed in the other surface thereof;

forming the alignment recesses by pressing the mold to the photo-curing adhesive to transfer the convex portions to the photo-curing adhesive; and curing the photo-curing adhesive by irradiating ultraviolet ray thereto.

16. A method for fabricating an optical module comprising the steps of:

preparing a mold having convex portion to form a plurality of alignment recesses or optical fibers;

adhering one surface of a planar transparent for adjusting a conjugate ratio to on a surface of a planar microlens array substrate having a plurality of microlenses formed in at least one surface thereof;

applying a photo-curing adhesive on the other surface of the transparent substrate, forming the alignment recesses by pressing the mold to the photo-curing adhesive to transfer the convex portions to the photo-curing adhesive; and curing the photo-curing adhesive by irradiating ultraviolet ray thereto.

17. A method for fabricating an optical module comprising the steps of:

preparing a mold having convex portions to form a plurality of alignment recesses for optical fibers;

applying a photo-curing adhesive on one surface of a planar transparent substrate for adjusting a conjugate ratio;

forming the alignment recesses by pressing the mold to the photo-curing adhesive to transfer the convex portions to the photo-curing adhesive; and adhering the other surface of the planar transparent substrate to a surface of a planar microlens array substrate having a plurality of microlenses formed in at least one surface thereof with the center of each alignment recess being aligned the center of a corresponding one of the microlens.

18. The method of claim 15, 16 or 17 wherein the step of forming the alignment recesses includes forming a tapered portion at an inlet portion of each alignment recess for guiding an optical fiber to be inserted into the alignment recess.

19. The method of claim 15, 16 or 17 wherein the step of forming the alignment recesses includes forming a recess for an optical element at the bottom of the alignment recess.

20. The method of claim 19 further comprising the steps of;

fitting the end of an optical fiber to the alignment recess; and adhering the end of an optical fiber to the recess by adhesive while forming a lens by filling the recess for an optical element with the adhesive.

21. The method of claim 15, 16, or 17 further comprising the steps of;

fitting the end of an optical fiber to the alignment recess; and adhering the end of an optical fiber to the alignment recess by adhesive.

\* \* \* \* \*